United States Patent
Stackhouse et al.

(10) Patent No.: US 7,437,728 B2
(45) Date of Patent: Oct. 14, 2008

(54) SYSTEM AND METHOD FOR CPU BANDWIDTH ALLOCATION

(75) Inventors: Christian Paul Stackhouse, Bothell, WA (US); Abhishek Agarwal, Hyderabad (IN); Narendra Babu T. V., Hyderabad (IN); Sujoy Gupta, Hyderabad (IN); Padma Priya A. B., Hyderabad (IN); Paramesh Vaidyanathan, Hyderabad (IN); Manoj K. Valiyaparambil, Hyderabad (IN)

(73) Assignee: Microsoft Corporation, Redmond, WA (US)

(*) Notice: Subject to any disclaimer, the term of this patent is extended or adjusted under 35 U.S.C. 154(b) by 938 days.

(21) Appl. No.: 10/460,527

(22) Filed: Jun. 12, 2003

(65) Prior Publication Data

US 2004/0255295 A1 Dec. 16, 2004

(51) Int. Cl.
*G06F 9/46* (2006.01)
*G06F 15/173* (2006.01)

(52) U.S. Cl. .................. 718/104; 718/102; 718/103; 709/223; 709/226

(58) Field of Classification Search ......... 718/100–108; 709/223–226
See application file for complete search history.

(56) References Cited

U.S. PATENT DOCUMENTS

| | | | |
|---|---|---|---|
| 5,414,845 A | 5/1995 | Behm et al. | |
| 6,038,651 A | 3/2000 | VanHuben et al. | |
| 6,282,561 B1 | 8/2001 | Jones et al. | |
| 6,393,455 B1 | 5/2002 | Eilert et al. | |
| 6,460,082 B1 | 10/2002 | Lumelsky et al. | |
| 6,529,950 B1 | 3/2003 | Lumelsky et al. | |
| 6,745,221 B1* | 6/2004 | Ronca | 718/104 |
| 6,785,889 B1* | 8/2004 | Williams | 718/104 |
| 6,859,926 B1* | 2/2005 | Brenner et al. | 718/100 |
| 7,140,020 B2* | 11/2006 | McCarthy et al. | 718/104 |
| 7,146,353 B2* | 12/2006 | Garg et al. | 707/2 |
| 7,159,184 B2* | 1/2007 | Ullah et al. | 715/762 |
| 7,174,379 B2* | 2/2007 | Agarwal et al. | 709/226 |
| 2003/0061262 A1* | 3/2003 | Hahn et al. | 709/104 |

* cited by examiner

*Primary Examiner*—Meng-Ai An
*Assistant Examiner*—Jennifer N To

(57) ABSTRACT

An automatic resource management service implements a policy to automatically control resource usage by processes running on a computer. A policy expresses criteria for identifying process sets, and imposes allocations and sub-allocations or resource amounts to be used by given process sets and subsets. Exclusion lists are used in an embodiment of the invention to exclude processes from management by the management service. In an embodiment of the invention the resources whose use is managed are CPU resources, although in further embodiments the managed resources include memory resources as well.

10 Claims, 6 Drawing Sheets

SYSTEM AND METHOD FOR CPU BANDWIDTH ALLOCATION

FIELD OF THE INVENTION

This invention relates generally to computer central processing unit bandwidth allocation and, more particularly, relates to a system and method for allocating CPU bandwidth automatically via a proportional prioritized construct.

BACKGROUND

Most computers and computing devices have one or more central processing units that execute the most basic operational units within the computer or device. Each application or process that needs to have the computer perform operations must use the central processing unit (CPU). However, a CPU can typically service only one process at a time. Accordingly, when a number of processes are running concurrently, they will compete for CPU resources, sometimes referred to as CPU bandwidth, to the exclusion of one another. The operating system of the computer is typically responsible for allocating CPU usage to various competing processes, but typically serves processes in an egalitarian fashion with no externally imposed priorities. The practical problem raised by this state of affairs is an inability to predictably and stably serve several applications using a single CPU. Thus, a machine having a single CPU cannot be reliably used to run more than a small number of well-behaved processes.

Processes can be designed to use CPU bandwidth in a "responsible" fashion, i.e. not taking all available resources, but rather accommodating the needs of other processes to some extent. However, the process of designing applications to be responsible users of CPU resources is more time-consuming than is designing applications that are not responsible, and is not generally done. In addition, as long as any one of the current processes or applications is not designed to be a responsible user of CPU resources, the original problem remains.

Several other methods have been tried in the past in attempts to address the issue of CPU sharing. In one such system, an administrator or other individual attempts to ensure proper simultaneous operation of multiple applications by manually setting a CPU usage level for each such application. However, this is time consuming and ineffective for a number of reasons. First, each application that supports this type of intervention exposes its own interface for setting CPU usage, and the administrator is required to access each such interface in order to set appropriate usage limitations. Secondly, this type of CPU usage allocation is static and does not accommodate changing conditions requiring a variation in CPU usage limits, such as, for example, when an application starts after the allocation is set. Another type of static CPU resource allocation is available in at least one operating system via a manual interface to the operating system "scheduler."

Another system sometimes used to run multiple applications using a single CPU is simply to test several applications for compatibility. If a particular group of applications is able to run concurrently without any application getting excluded from CPU resources to the point of being inoperable, then that group of applications is run together. This system is inflexible in that only those applications already able to "play well together" can be reliably run together. Moreover, the particular mix of applications can only be supplemented or changed, if at all, after further testing.

BRIEF SUMMARY OF THE INVENTION

In an embodiment of the invention, a management service automatically controls the amount of CPU resources or other resources consumed by processes running on a computer. Although the service can manage any processes, an important scenario wherein an embodiment of the invention may be used is in a server environment where several large resource-hungry and/or enterprise-critical applications are running on a server. Although the invention is described by reference to multiple services and/or processes, there is no requirement that the application or processes running be different. For example, embodiments of the invention are also usable to manage multiple instances of the same process or processes originating, for example, from multiple instantiations of a single application. Another usage scenario in an embodiment of the invention is with respect to a server hosting user desktops wherein the management service is used to manage the resources used by various users. In addition, embodiments of the invention may be used to manage multiple processes on a single server, each process corresponding to a different web site. The foregoing listing of usage scenarios is not exhaustive, as the invention may be beneficially applied to the management of any set of processes.

The service dynamically implements and enforces a policy that classifies and prioritizes processes using an interface to a scheduler that controls CPU usage. In an embodiment of the invention, the management algorithm employs exclusion lists in order to determine which processes if any will be excluded from management by the management service. The exclusion lists can comprise a system exclusion list and/or a user exclusion list, wherein the system exclusion list is unalterable by the user or administrator and the user exclusion list is alterable by the user or administrator. Hereinafter, the management system will be described as configured and maintained by an administrator, and although an administrator or similar personnel will typically be responsible for controlling and configuring the management service, the invention is not so limited. Thus, no limitation or requirement as to the identity of the human operator within the invention is implied by the use of the term administrator.

The policies used by the management service comprise subsets according to an embodiment of the invention. In this manner, for example, the resources allocated to a class of processes may be further sub-allocated between various members of the class. The sub-allocation of resources according to the policy may proceed on an even distribution basis or may be modified by the administrator to incorporate another level of priority determination.

The management service may be used to manage processes belonging to a single user, or multiple processes belonging to a plurality of respective users. As discussed, the latter case may occur in a scenario of a server hosting user desktops wherein numerous potentially remote users are simultaneously using the resources of a single machine.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
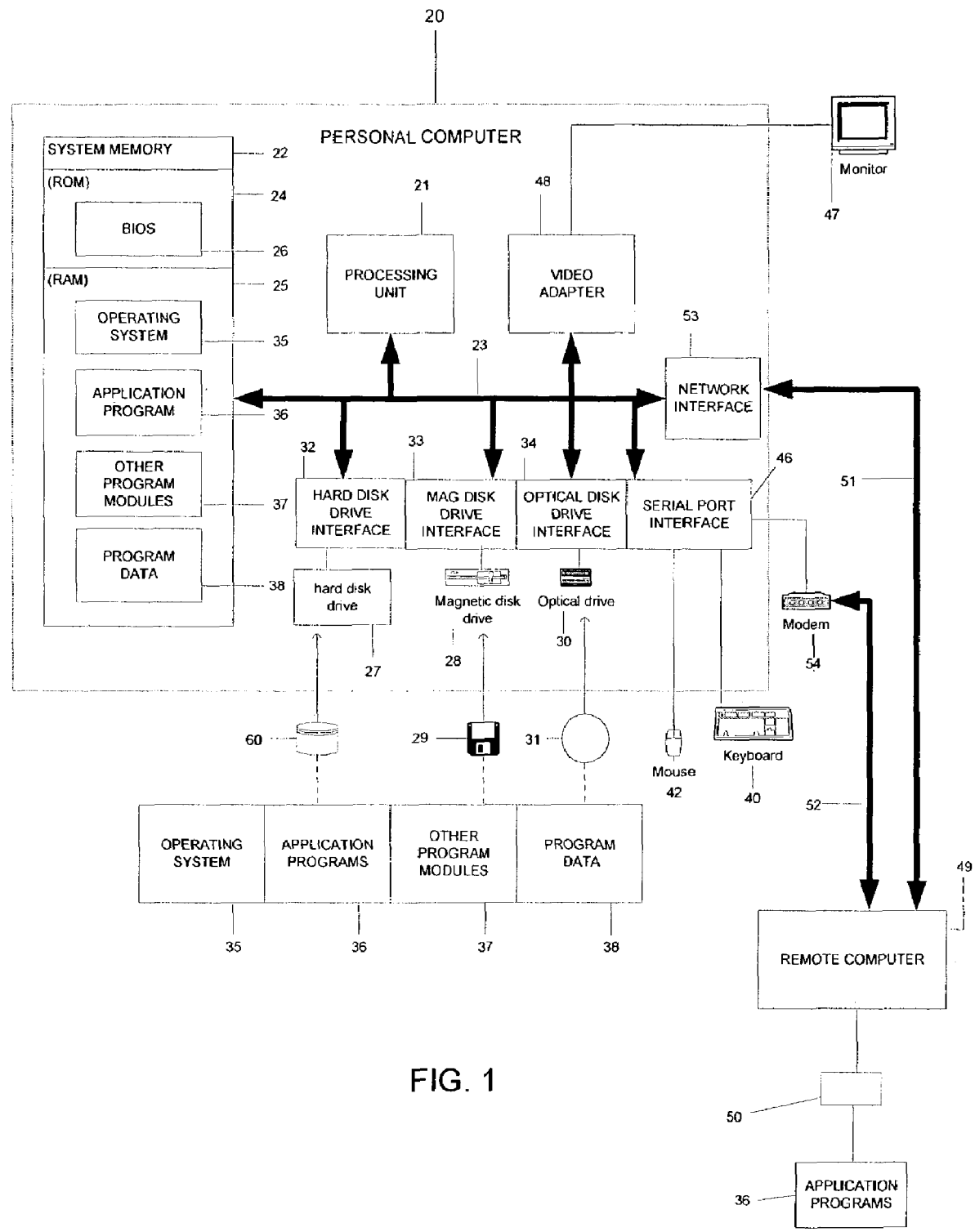
FIG. 1 is a schematic diagram generally illustrating an exemplary device architecture in which embodiments of the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, mini-computers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the invention will be described in greater detail with reference to FIG. 2 and subsequent Figures. Turning now to FIG. 1, a general purpose computing device is shown in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computers typically include other peripheral output devices, not shown, such as speakers and printers.

The computer 20 may operate in a networked environment using logical connections to one or more remote computers, such as a remote computer 49. The remote computer 49 may be a personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. Program modules depicted relative to the computer 20, or portions thereof, may be stored in the remote memory storage device if such is present. It will be appreciated that the network connections shown are exemplary and other means of establishing a communications link between the computers may be used in embodiments of the invention.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
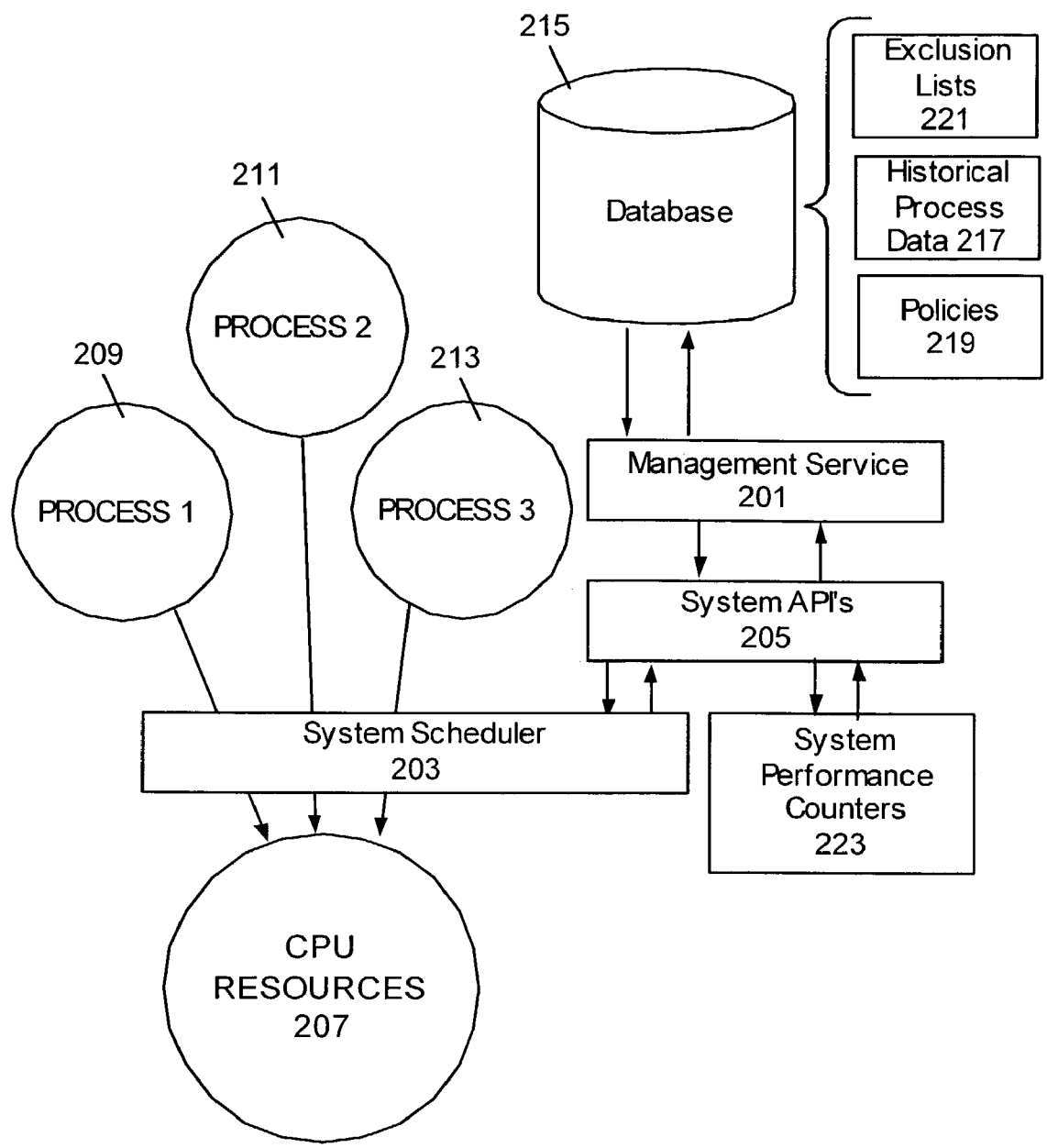
FIG. 2 is a schematic diagram of a management service including interfaces and data sources usable by the management service within an embodiment of the invention.

Turning to FIG. 2, an architectural diagram is shown, illustrating a management service 201, according to an embodiment of the invention, and the general operating environment thereof. In particular, the management service 201 interfaces with a system scheduler 203 via one or more application programming interfaces (API's) 205. The system scheduler 203 is a component typically used by the operating system to schedule access of processes to CPU resources 207. Also illustrated are exemplary processes Process 1 (209), Process 2 (211), and Process 3 (213) competing for CPU resources 207, with their access to those resources 207 being restricted and controlled by the system scheduler 203.

The management service 201 may further access a database 215. The database 215 can supply any information needed by the management service 201. In an embodiment of the invention, the database 215 contains a number of records including historical process behavior information 217, one or more policies 219, and one or more exclusion lists 221. Policies will be discussed in greater detail with respect to FIG. 3 and FIG. 4.

Figure 3:
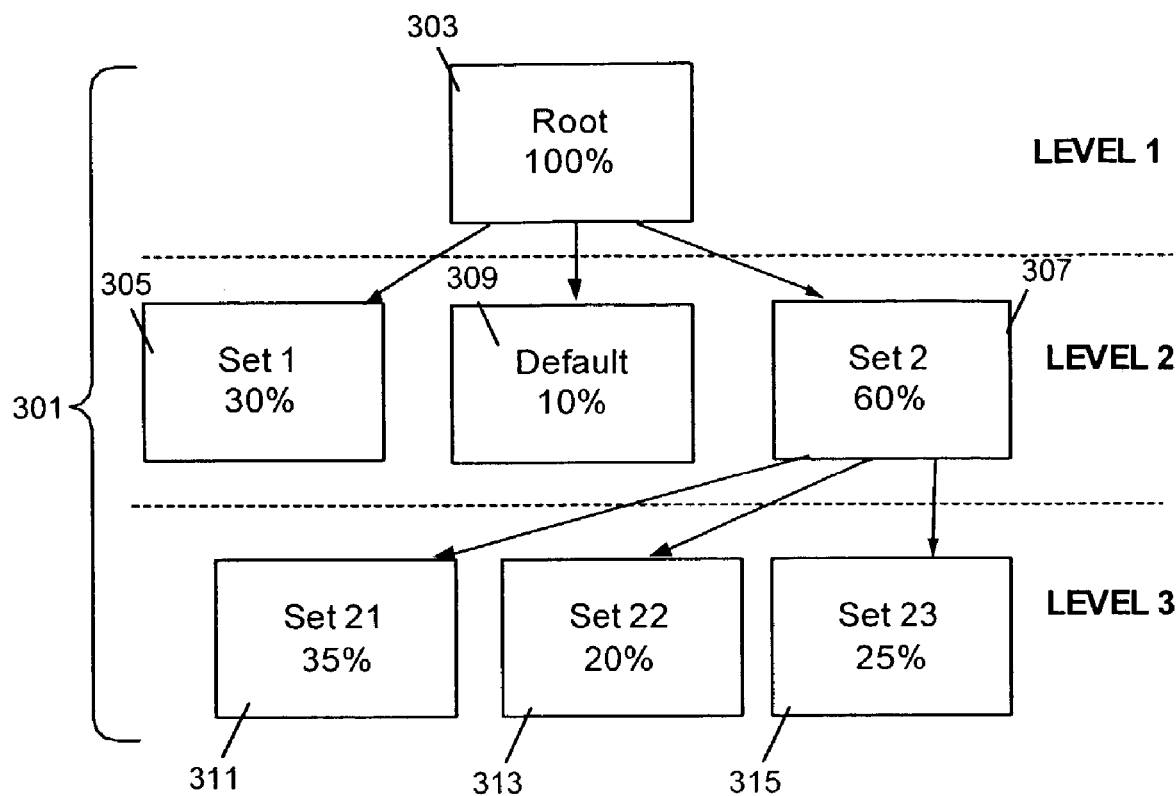
FIG. 3 is a schematic diagram of an administrator-created resource management policy usable by a management service according to an embodiment of the invention.

Referring now to FIG. 3, an exemplary policy 301 is illustrated in logical schematic form as created by an administrator. The policy 301 may have a hierarchical logical structure. The policy 301 defines target allocations of CPU resources, and each level of the structure represents a sub-allocation of one or more of the allocations from a preceding level. There may be any number of levels of allocation, although in the example of FIG. 3, only levels 2 and 3 define allocations.

The policy expresses the target percentage of available resources that are to be made available to defined sets of processes. Thus, in the example policy 301 shown in FIG. 3, the Root node 303 of level 1 represents the amount of resources available for management by the management service 201. Typically the policy 301 will not expressly define this node, as it will generally be assumed that 100% of the resources available for management by the service 201 will be managed, although such need not be the case. At level 2, several distinct process sets are associated with appropriate allocations. Note that allocation percentages and sub-allocation percentages are targets, and that the actual amount of resources used by processes is dynamic and may vary slightly, and indeed the target allocations and sub-allocations may actually be changed by the service 201 during management as will be discussed later. Each set represents one or more processes, and the manner in which sets are created will be described later herein. According to the illustrated policy 301, Set 1 is allocated 30% of the resources available for management at node 305. Similarly, at node 307 Set 2 is allocated 60% of the resources available for management. Finally, a default set is allocated 10% of the resources available for management at node 309.

The default set is typically not explicitly given an allocation by the administrator. Rather, once the administrator has specified allocations for the sets that the administrator wants to manage, then the remaining resources are allocated to the default set. In an embodiment of the invention, an upper bound on user allocations is imposed, so that a lower bound on the resources available to the default set is created.

At level 3, the administrator has created express sub-allocations for the resources allocated at node 307 of level 2. In particular, sets 21, 22, and 23, which may be subsets of set 2, have been given respective sub-allocations of 35%, 20%, and 25% at nodes 311, 313, and 315. Note that the allocations 305, 307, 309 at level 2, including the default allocation, consume 100% of the resources available for management. However, the express sub-allocations 311, 313, 315 need not consume 100% of the allocation of their parent node. This is because although the administrator may specify express sub-allocations, the administrator may not have specified such a sub-allocation for every member of the parent set. Note that in an alternative embodiment of the invention, the sub-allocations from an allocation can be assigned to any set of processes, rather than just to processes that are within a subset of the original set.

Figure 4:
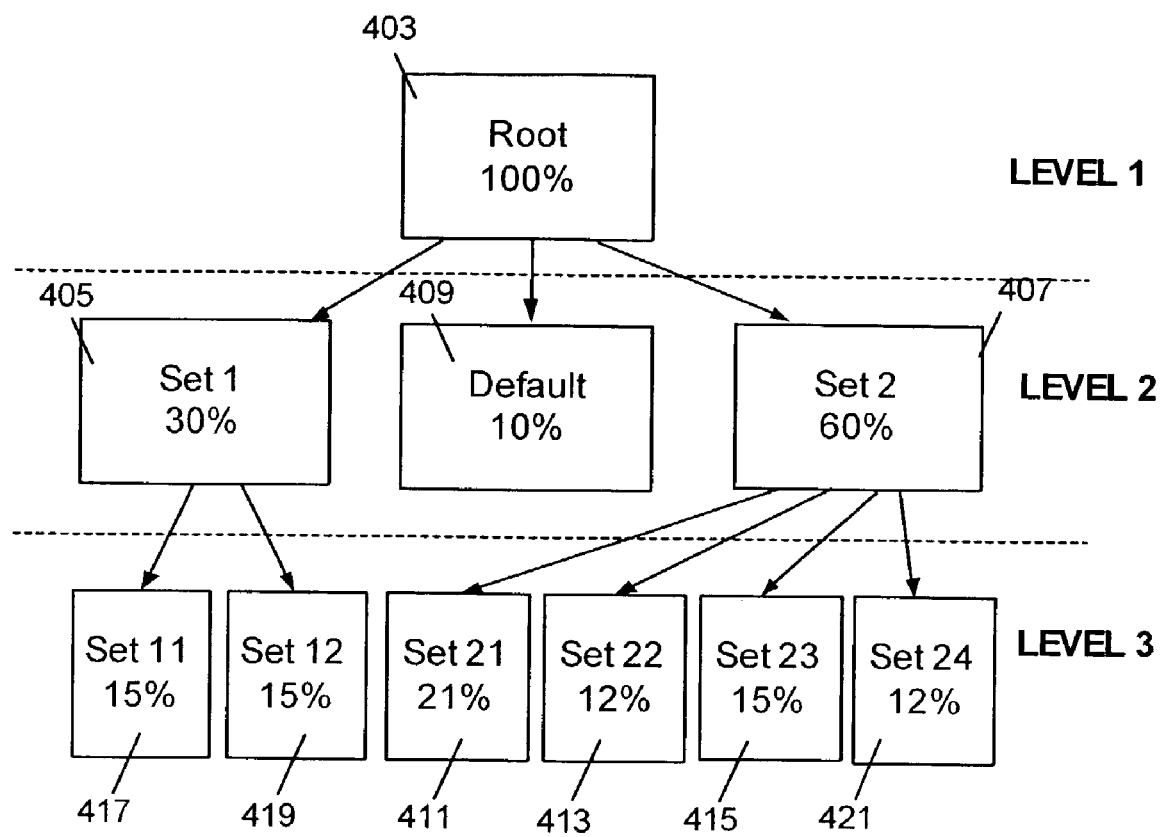
FIG. 4 is a schematic diagram of an internal representation of a resource management policy derived from the administrator-created policy of FIG. 3, usable by a management service according to an embodiment of the invention.

This can be understood more clearly from FIG. 4, which illustrates schematically an internal or working representation of target allocations resulting from the administrator-specified allocations shown in FIG. 3. In particular, the resultant working allocations are the same in levels 1 and 2 as they were in the administrator-specified policy of FIG. 3. However, at level 3, the resulting allocations are expressed differently. For example, the allocation for Set 1 at node 405, which had no administrator-specified sub-allocation as seen in FIG. 3, has now been resolved into sub-allocations to set 11 and set 12 at nodes 417 and 419 respectively. With respect to set 2 at node 407, its administrator-specified sub-allocations have been reformatted at nodes 411, 413, 415 respectively and an additional sub-allocation added at node 421.

Note that the administrator sub-allocation of node 307, given at nodes 311, 313, and 315, consumes only 80% of the parent allocation. Similarly, no sub-allocation has been specified for set 1 (node 305), although in our example set 1 will comprise a plurality of distinct process sets. The resultant internal representation generated at run time and shown in FIG. 4 addresses these complications. In particular, each sub-allocation or allocation that will not be further sub-allocated is expressed as a percentage of the total resources available for management by the management service 201 rather than as a percentage of a parent allocation. In addition, for each parent set that comprises multiple sets and for which the sub-allocation is unspecified (as with set 1 at node 305) or only partially specified (as with set 2 at node 307), the sub-allocation is automatically specified or completed respectively. Although the internal representation of FIG. 4 is generated at run time, it is preferable to regenerate the representation whenever a new process starts or a process terminates.

Thus, in the policy representation of FIG. 4, the resources allocated to set 1 at node 405 have been automatically sub-allocated to the sets contained in set 1, i.e. set 11 (node 417) and set 12 (node 419). A manner of sub-allocation may be specified by the administrator in lieu of specifying precise sub-allocations. As a default, or in an embodiment of the invention as an administrator-selectable option, the manner of sub-allocation is "equal per process," meaning that the parent allocation is divided evenly among all child processes under that parent. This is the case in the example of FIG. 4, where the resources available to set 1 at node 405 (i.e. 30%) have been evenly divided among the processes that make up set 1, namely process 11 at node 417 has been sub-allocated 15%, and process 12 at node 419 has also been sub-allocated 15%. As discussed, in the working representation of the policy as shown in FIG. 4, sub-allocations represent a percentage of the total resources available for management rather than a percentage of the parent allocation. Thus the two 15% sub-allocations of the resources of set 1 consume 100% of the resources allocated to set 1. A node that is not further sub--divisible into component subsets is referred to as a leaf node.

In an embodiment of the invention, leaf nodes are single instances of manageable objects and represent single processes. Nodes 417 and 419 are examples of leaf nodes.

As described above, there may be processes that do not meet process matching criteria for any set, and these processes are managed via the default set 409. In an embodiment of the invention, the default set receives an allocation equal to the resources remaining unallocated after administrator-specified allocations are accounted for.

Another manner of automatic sub-allocation is "equal per user." Thus, an allocation for a set that comprises processes corresponding to multiple users, such as in a terminal services environment, may be sub-divided into a number of sub-allocations, each sub-allocation corresponding to the processes associated with a given user, and each sub-allocation being equal to each other sub-allocation from the same parent node. Note that rule sub-allocations (e.g. "equal per user," "equal per process," etc.) may also be used at higher levels in lieu of specific allocations.

As noted above, another type of automatic sub-allocation occurs when a parent has been partially but not completely sub-allocated. Such is the case with respect to set 2 at node 407. The express sub-allocations given by nodes 411, 413, and 415 amount to 80% of the allocation for set 2, leaving 20% of the allocation for set 2 not expressly sub-allocated. In this case, the unallocated portion is sub-allocated to an additional sub-set, represented by set 24 at node 421. The additional set 24 comprises those processes that meet the criteria to be part of the parent set 2, but that do not meet the criteria to be part of any of the expressly administrator-specified subsets, i.e. set 21 (node 411), set 22 (node 413), and set 23 (node 415). This type of automatic sub-allocation assures that for any set that is sub-allocatable, all sub-allocations occur in leaf nodes, with the parent node simply representing the aggregation of the leaf nodes associated with it.

As discussed above, a policy consists of sets of processes, each set being associated with an allocation of resources. The way in which process sets are specified is not critical, and any number of techniques may be used. However, an exemplary technique is discussed in greater detail hereinafter.

In particular, the administrator creates sets by specifying process matching criteria that must be matched for a process to belong to each set. Preferably a process belongs to only one set in a given level of the policy, and thus a convention is useful for deciding to which set to assign a process when it potentially matches criteria for multiple sets in one level. In an embodiment of the invention, the convention used is that a process is associated with the first set for which a match is found. Further refinements of the preliminary matches will be discussed later with respect to exclusion lists.

The types of matching criteria that may be used are not limited, but several types of criteria have been identified to be useful. In an embodiment of the invention, the process matching criteria comprise an identifier of an initiator associated with the commencement of the process and/or a user identity associated with the process. The first category includes such things as the path used to initiate the process (e.g. c:\program files\database server\instance1), the name of the program creating the process (e.g. databaseapplication.exe), and/or command line options or parameters used to run the process. Preferably, regular expression pattern matching is supported with respect to determining a match on any of these criteria types. The second category of criteria in this embodiment of the invention includes both a user name of the account associated with the process and/or a group name associated with a group to which the process user belongs. It is contemplated that criteria other than or in addition to those described above will be used in conjunction with embodiments of the invention.

As noted above, process groups can be identified by multiple match criteria. In addition, in an embodiment of the invention, logical operations involving match criteria are also supported. For example, AND, OR, and NOT operators may be used to increase the usefulness of the match criteria. Thus an administrator may want to create a process set that contains all processes associated with a word processor wordproc.exe except those processes also associated with a particular user BOB. The resultant match criteria would embody the following logical condition:

[(application=wordproc.exe)&(user≠BOB)]

In the event that a preliminary match is made using process matching criteria to populate one or more sets for management by the management service 201, the matched process or processes may still be excluded from management by the service 201 if listed on an exclusion list. As noted briefly above in connection with FIG. 2, in an embodiment of the invention, two types of exclusion list are used, the first being a system exclusion list and the second being a user exclusion list. Generally, the distinction between the lists is that former pertains to processes that have been placed outside of administrator control for reasons of system stability, safety, etc. Such processes generally include any processes essential to providing operating system features and functions.

In contrast, the user exclusion list pertains to all other processes, i.e. processes that are not listed on the system exclusion list. The administrator may want to exclude a process from management for any number of reasons, even when a match of the process to a managed set is made. For example, in the example above wherein an administrator created the match criteria [(application=wordproc.exe)&(user≠BOB)], the administrator may instead choose to exclude BOB's processes not just from this set, but from all managed sets. In this case, the administrator could simply choose the criterion [(application=wordproc.exe)] for their set and place a criteria on the user exclusion list identifying processes associated with the user BOB. Logically, this criteria will simply embody the condition [user=BOB]. Thus, even if a wordproc.exe process owned by BOB is running, it will not be managed by the service 201 since any process owned by BOB is excluded by the user exclusion list.

As noted above in connection with FIG. 2, the database 215 employed by the management service 201 preferably comprises a number of records including policies 219 as discussed above and exclusion lists 221 also as discussed above. Moreover, the service 201 may also maintain within the database 215 an historical record 217 of process and management behavior. In particular, in an embodiment of the invention, when a policy is in effect, the process and management information collected includes one or more of the following: system date and time stamp when the record was created, process start date and time, record source (process start, sample or end), process matching criteria name, resource allocation name, process image name, process image path, process ID, parent process ID, session ID, owned/started by user name, owned/started by domain name, kernel CPU time, user mode CPU time, number of threads, peak number of threads, virtual memory, peak virtual memory, page faults, private page count, working set size, peak working set size, page file usage, peak page file usage, non-paged pool usage, peak non-paged pool usage, paged pool usage, peak paged pool usage, I/O reads, I/O read bytes, I/O writes, I/O write bytes, I/O other, and I/O other bytes, as well as any other information for which historical information is desired.

In an embodiment of the invention, the historical information is retrieved periodically such as every 30 seconds. However, it is preferable that the administrator be able to modify the collection interval or the interval between storage of collected data depending upon a balance between needed accuracy and constraints on the size or growth rate of the record storage requirements 217. Preferably, the historical information 217 is available to the administrator via a user interface that supports aggregation, sorting, filtering, and customization of display format, so that the historical information 217 may be most effectively utilized.

Figure 5:
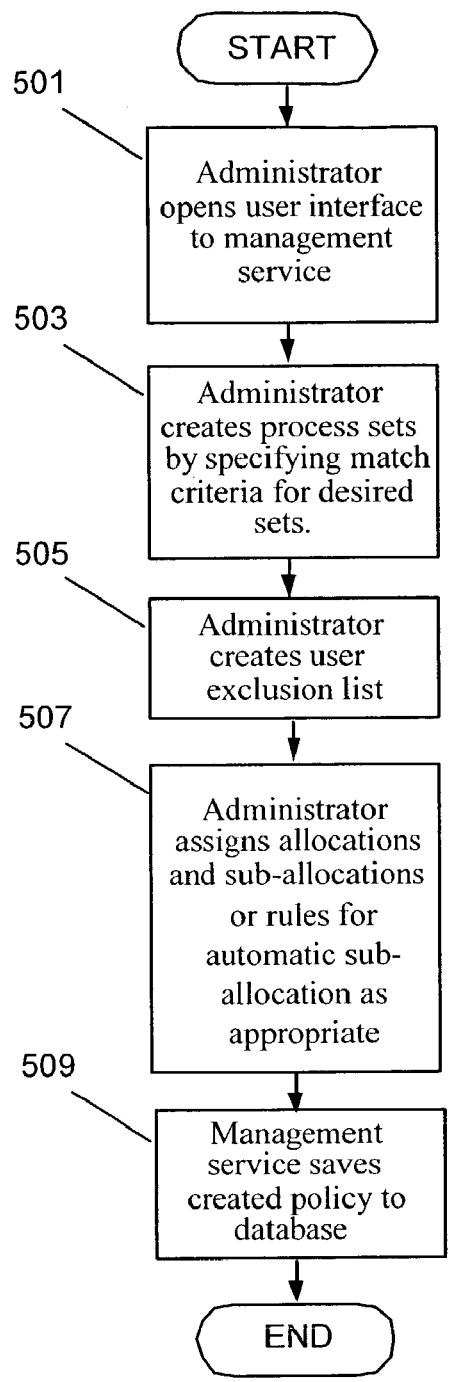
FIG. 5 is a flow chart of a process according to an embodiment of the invention for creating a policy usable by a management service according to an embodiment of the invention.

The use and operation of the management service 201 and the surrounding architecture is described hereinafter with reference to FIGS. 5 and 6. Referring now to FIG. 5, a process for creating a policy is illustrated. At step 501, the administrator opens the user interface to the management service 201. The user interface can be presented either locally on the machine on which the service 201 resides or may be presented remotely at another machine. In either case, the user interface may be either a graphical user interface, typically including text as well as graphics other than text, or a command line interface. The type of interface is not critical, and those of skill in the art will appreciate that any other type of user interface may be employed.

At step 503, the administrator creates process sets by specifying match criteria for the desired sets. Preferably, the administrator assigns a name or other identifier to each set created. As discussed above, the administrator need not allocate 100% of the available resources or create an allocation for every process that may run, since the default group 309, 409 will accommodate all unaddressed processes. At step 505, the administrator creates a user exclusion list embodying any exclusions that the administrator would like to implement. The user exclusion list may be embodied via any combination of exclusion criteria, as discussed above, and explicit process names for exclusion.

At step 507, the administrator assigns allocations and sub-allocations as appropriate to sets created in step 505. Note that the administrator is preferably prevented from assigning greater than a predetermined subset, such as 95%, of the resources available for management, so that unaddressed processes will nonetheless be able to access resources. At this point the administrator may signal completion of the policy such as by striking a key or combination of keys or by selecting a menu item or icon. Preferably, the administrator names or otherwise identifies the policy created to distinguish it from other policies, since there may exist a number of policies, although preferably only one policy is active at any moment. After the administrator has completed specifying a policy including process sets and corresponding allocations and sub-allocations, as well as any rules for automatic sub-allocation, then at step 509, the management service saves the newly-created policy to the database 215.

Once one or more policies have been created and are available, the administrator may activate a policy. In particular, the administrator may choose a particular policy for immediate activation or may schedule activation of one or more policies for mutually exclusive activation at selected times. As well, the administrator may choose a policy for immediate activation and in addition schedule one or more other policies for later activation at separate respective times. The choice of which policy to activate at what time may be made based on any criteria. For example, the types of processes running in a computer environment, as well as the types of priorities that one may appropriately assign to processes, may vary cyclically on a daily, weekly, monthly, or yearly basis.

Preferably, the scheduler of the management service allows great latitude to the administrator in scheduling policies for activation. For example, it is preferred that the management service support scheduling of policy activation on a one-time or recurring basis. In the case of scheduled one-time activation, the administrator preferably supplies a start date/time and either an end date/time or duration. In the case of scheduled recurring activation, the administrator supplies either a period (e.g. "once every thirty days") or a repeating date (e.g. "first of every month," "356$^{th}$ day of every year"), as well as a duration for each activation (e.g. "three days").

As discussed above, when a policy is active, the management service 201 controls the usage of resources in accordance with the policy. Essentially, the management service determines which sets are consuming less than their allocations and which sets are consuming more than their allocations. The service then boosts the priority of processes in sets that are underutilizing resources while lowering the priority of process in sets that are over utilizing resources.

Figure 6:
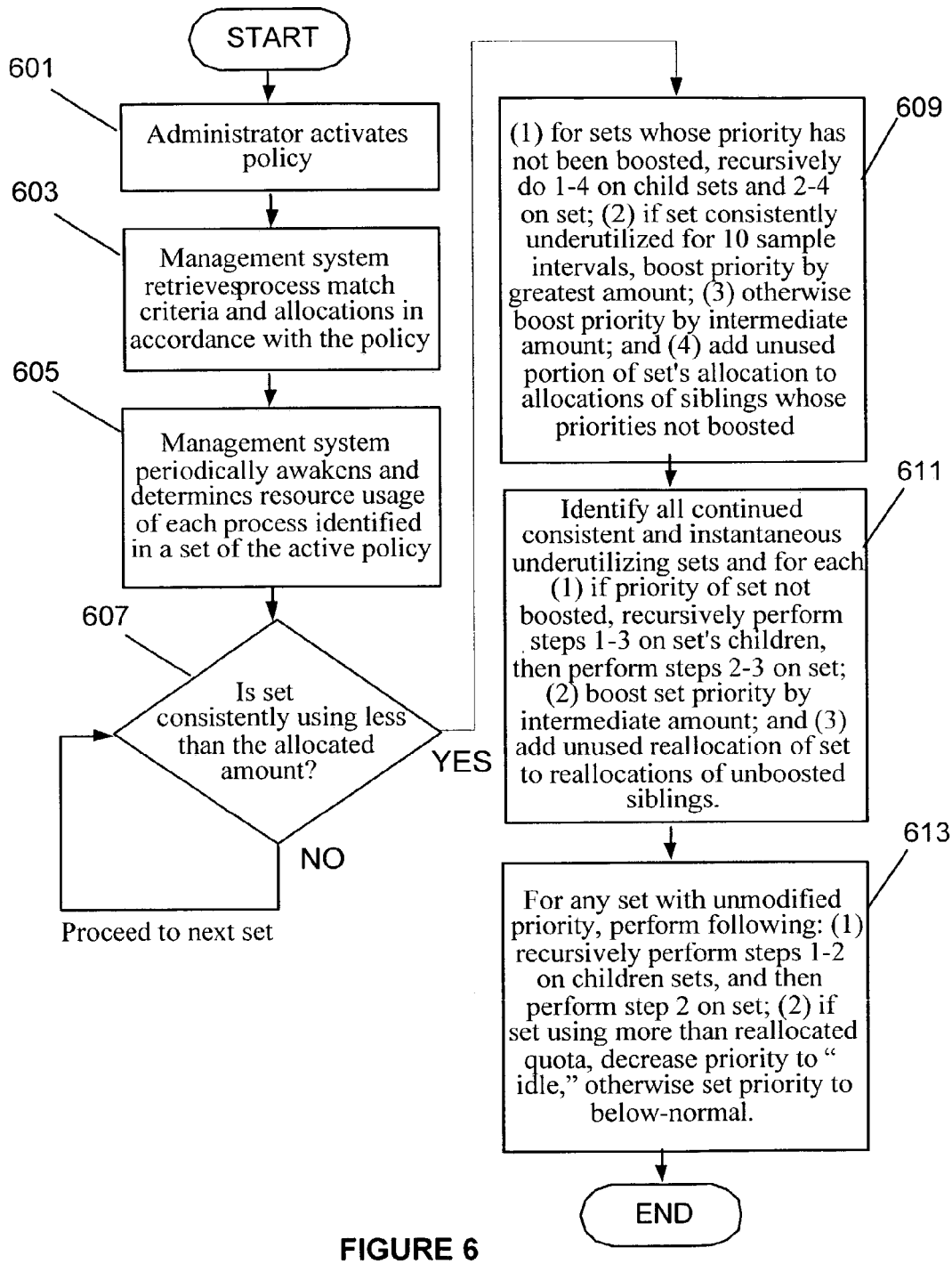
FIG. 6 is a flow chart of a process of resource management according to an embodiment of the invention.

The flow chart of FIG. 6 explains in greater detail how the management of resources is accomplished. At step 601 of the process, an administrator activates a policy, such as by express immediate activation or via scheduling as discussed prior. At step 603, the management system retrieves process matching criteria and allocations in accordance with the policy for reference during management. At step 605, the management service periodically awakens, such as every second, and begins to perform its management function by determining the resource usage of each process identified in a set of the active policy. Note that the process matching logic is preferably also executed at runtime to correctly assign processes to their matching sets for allocation since processes may start and stop at any time. The service can use standard available services via API's 205 such as performance counters 223 to determine the resource usage of relevant processes. Note that as part of this step, the service may also maintain historical resource usage data for past sample intervals, such as in historical record 217 of the database 215. In an alternative embodiment of the invention, the historical resource usage information is also later retrieved from the historical record 217 of the database 215.

Having determined the actual resource usage of the managed processes, the management service performs steps 607 et seq. for each set. In particular, the service determines at step 607 whether for each set of processes, less than the allocated amount of resources is consistently being used. In an embodiment of the invention, this determination looks at resource usage over a predetermined period, such as 5 sample cycles to determine whether usage is consistently low.

If it is determined at step 607 that a set of processes is consistently using less than its allocated amount of resources, then at step 609, the process performs the following sequence of steps: (1) for sets whose priority has not been boosted, recursively perform 1-4 on child sets and steps 2-4 on set; (2) if the set has consistently underutilized for 10 consecutive sample intervals, boost its priority by a greatest amount; (3) if the set has not consistently underutilized for less than 10 consecutive sample intervals, boost its priority by a lesser intermediate amount; and (4) add the unused portion of the set's allocation to the allocations of the siblings of the set whose priorities have not been boosted, the reallocation being made in approximately the same proportions as the original allocations.

Next at step 611, the service identifies all continued consistent and instantaneous underutilizing sets, i.e. those sets whose resource usage in the current sample interval is less than the set's reallocated quota and whose resource usage over 5 consecutive sample intervals has been below the reallocated quota. For each such set, the service performs the following sequence: (1) if the priority of the set has not been boosted, then recursively perform steps 1-3 on set's children sets, and then perform steps 2-3 on set; (2) boost set priority by intermediate amount; and (3) add unused reallocation of set to reallocations of siblings not yet boosted in the same proportion as original allocation.

Finally, at step 613, for any set that has not had its priority modified, the service performs the following sequence: (1) recursively perform steps 1-2 on set's children sets, and then perform steps 2 on set; (2) if the set is using more than its reallocated quota, decrease its priority to a lowest amount of "idle," and otherwise regulate the set priority to an intermediate low value of below-normal.

Although the discussion above focuses primarily on management of CPU resources, the invention also applies to the management of other types of resources as well. Thus, in embodiments of the invention, the resources managed by the management service include additionally or alternatively process working set size (physical resident pages) and/or committed memory (page table and page file usage). Control over working set size can be exercised via appropriate APIs or otherwise. For example, those of skill in the art will appreciate that APIs are available to instruct the operating system to constrain the working set size of a process. For example, the operating system may be instructed via an appropriate API or otherwise to reserve a minimum amount of memory for a process and also to prohibit physical memory use by the process beyond a certain predetermined limit. Management of memory use may be beneficial, for example when CPU usage limitations are ineffective due to application memory consumption patterns. Memory management may be effected via establishment of an upper limit on the working set size for an application or process, with the limitation being enforced by appropriate kernel functions. Similarly, limitations on committed memory can be used to handle "leaky" applications that for whatever reason have trouble de-allocating memory or having memory de-allocated. Intervention may be provided for processes or applications that exceed memory limits, including displaying a warning and/or shutting down the offending application or process. The setting of limits on resources other than CPU resources may be accomplished via the same user interface used for setting CPU allocations, and such other limitations and allocations are preferably stored in the relevant nodes of the policy as with CPU limitations. Note that as described above the memory management rules may be a simple maximum for all matching processes, or may instead entail more complicated allocations, sub-allocations, and so on.

It will be appreciated that an improved resource management system and method have been described. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method of automatically managing resource usage for a plurality of processes running on a computing device, each process being associated with a respective system priority that defines the process's priority of access to resources, the method comprising:

retrieving a resource usage policy defining a plurality of desired resource allocations for a respective plurality of process sets;

determining the current resource usage of processes in a particular process set;

determining the past resource usage of processes in the particular process set during a predetermined past period;

if the current resource usage is less than the resource allocation for the particular process set, and if the past resource usage is less than the resource allocation for the particular process set, raising priorities associated with all processes of the particular process set by a first increment;

if the current resource usage is less than the resource allocation for the particular process set, and if the past resource usage is not less than the resource allocation for the particular process set, raising the priorities associated with all processes of the particular process set by a second increment, wherein the second increment is less than the first increment; and automatically lowering the resource allocation for the particular process set by a decrement amount and raising the resource allocation for at least one other process set by the decrement amount, by:

identifying a plurality of sibling process sets that share a common parent set with the particular process set, each of the plurality of sibling process sets having a desired resource allocation defined by the policy; and assigning a portion of the resource allocation of the particular set to each sibling process set to create respective resource reallocations for the sibling process sets, such that the mutual proportions of the resource reallocations of the sibling process sets are substantially the same as the resource allocations of the sibling process sets.

2. The method according to claim 1 further comprising:

waiting for expiration of a predefined period;

upon expiration of the predefined period, determining the current resource usage of the sibling processes;

identifying an underutilizing sibling process set that is using fewer resources than permitted by its resource reallocation; and distributing a portion of the resource reallocation of the underutilizing sibling process to the other sibling processes.

3. The method according to claim 1 wherein the resource usage policy comprises:

one or more criteria sets, each criteria set defining criteria for process membership in one or more respective process sets; and one or more allocations, each allocation defining a desired resource usage for at least one of the one or more process sets.

4. The method according to claim 3 wherein the criteria for process membership in one or more respective process sets include at least one criterion selected from the group consisting of a path used to initiate the process, a name of a program creating the process, a command line option used to run the process, a command line parameter used to run the process, a user name of an account associated with the process, and a group name associated with a group to which a user associated with the process belongs.

5. The method according to claim 3 wherein the one or more allocations define a portion of CPU resources to be used by the at least one of the one or more process sets.

6. The method according to claim 3 wherein the one or more allocations define a type and portion of memory resources to be used by the at least one of the one or more process sets.

7. The method according to claim 1 further comprising obtaining one or more exclusion lists, the one or more exclusion lists defining one or more processes whose resource usage is not managed.

8. The method according to claim 7 wherein the one or more exclusion lists comprise a user exclusion list and a system exclusion list, the user exclusion list being specified by a user and the system exclusion list being unmodifiable by the user.

9. The method according to claim 1 wherein the policy obtained via the data interface is specified by a user.

10. A computer-readable medium having stored thereon computer-executable instructions for executing the steps of:

retrieving a resource usage policy defining a plurality of desired resource allocations for a respective plurality of process sets;

determining the current resource usage of processes in a particular process set;

determining the past resource usage of processes in the particular process set during a predetermined past period;

if the current resource usage is less than the resource allocation for the particular process set, and if the past resource usage is less than the resource allocation for the particular process set, raising priorities associated with all processes of the particular process set by a first increment;

if the current resource usage is less than the resource allocation for the particular process set, and if the past resource usage is not less than the resource allocation for the particular process set, raising the priorities associated with all processes of the particular process set by a second increment, wherein the second increment is less than the first increment; and automatically lowering the resource allocation for the particular process set by a decrement amount and raising the resource allocation for at least one other process set by the decrement amount, by:

identifying a plurality of sibling process sets that share a common parent set with the particular process set, each of the plurality of sibling process sets having a desired resource allocation defined by the policy; and assigning a portion of the resource allocation of the particular set to each sibling process set to create respective resource reallocations for the sibling process sets, such that the mutual proportions of the resource reallocations of the sibling process sets are substantially the same as the resource allocations of the sibling process sets.

\* \* \* \* \*